United States Patent [19]
Schaefer et al.

[11] Patent Number: 5,321,684
[45] Date of Patent: Jun. 14, 1994

[54] BIDIRECTIONAL SINUSOIDAL SCANNING SYSTEM

[75] Inventors: Louis F. Schaefer, Palo Alto; Hugh F. Frohbach, Sunnyvale; Norman A. Peppers, Belmont, all of Calif.

[73] Assignee: SRI International, Menlo Park, Calif.

[21] Appl. No.: 944,978

[22] Filed: Sep. 15, 1992

[51] Int. Cl.$^5$ ............... G11B 25/06; G11B 21/04; G11B 7/007; G02B 26/10

[52] U.S. Cl. ............... 369/119; 369/44.15; 369/219; 369/220; 369/221; 359/201; 359/209; 359/210; 359/213; 359/214; 359/215

[58] Field of Search ............... 369/44.13, 44.15, 119, 369/219, 220, 221; 359/201, 202, 209, 210, 213, 214, 219, 221

[56] References Cited

U.S. PATENT DOCUMENTS

| | | | |
|---|---|---|---|
| 3,836,225 | 9/1974 | Wilde et al. | 350/6 |
| 4,264,986 | 4/1981 | Willis | 365/124 |
| 4,371,954 | 2/1983 | Cornet | 365/126 |
| 4,398,203 | 8/1983 | Cornet | 346/135.1 |
| 4,404,656 | 9/1983 | Cornet | 369/126 |
| 4,538,159 | 8/1985 | Gupta et al. | 346/135.1 |
| 4,567,585 | 1/1986 | Gelbart | 369/97 |
| 4,647,947 | 3/1987 | Takeoka et al. | 346/135.1 |
| 4,719,615 | 1/1988 | Feyrer et al. | 369/284 |
| 4,912,696 | 3/1990 | Feyrer et al. | 369/100 |
| 5,237,556 | 8/1993 | Pierce | 369/97 |

FOREIGN PATENT DOCUMENTS 0092912 4/1988 Japan ............... G02B 26/10

OTHER PUBLICATIONS

Bueche, F. J. *Schaumb Outline of College Physics*, 7th ed., New York, McGraw-Hill, 1979, pp. 87-89.

*Primary Examiner*—Paul M. Dzierzynski
*Assistant Examiner*—David V. Bruce
*Attorney, Agent, or Firm*—Burns, Doane, Swecker & Mathis

[57] ABSTRACT

In a preferred embodiment, the invention relates to systems and methods for storing digital video information on an optical recording medium comprising the steps of moving the optical recording medium in a first direction, sinusoidally scanning a beam of light over the moving optical recording medium in a second direction substantially perpendicular to the first direction to establish a scan path over the optical recording medium, and periodically deflecting the sinusoidal scanning beam in the first direction to linearize at least a portion of the scan path. By linearizing at least a portion of the scan path, two traces can be made per cycle of a primary sinusoidal deflection, thereby doubling scanning efficiency.

13 Claims, 3 Drawing Sheets

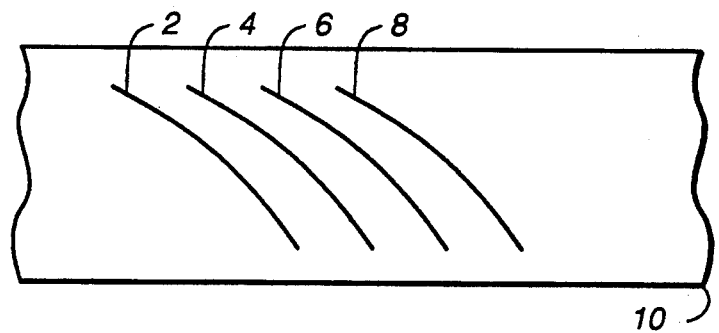
FIG._1
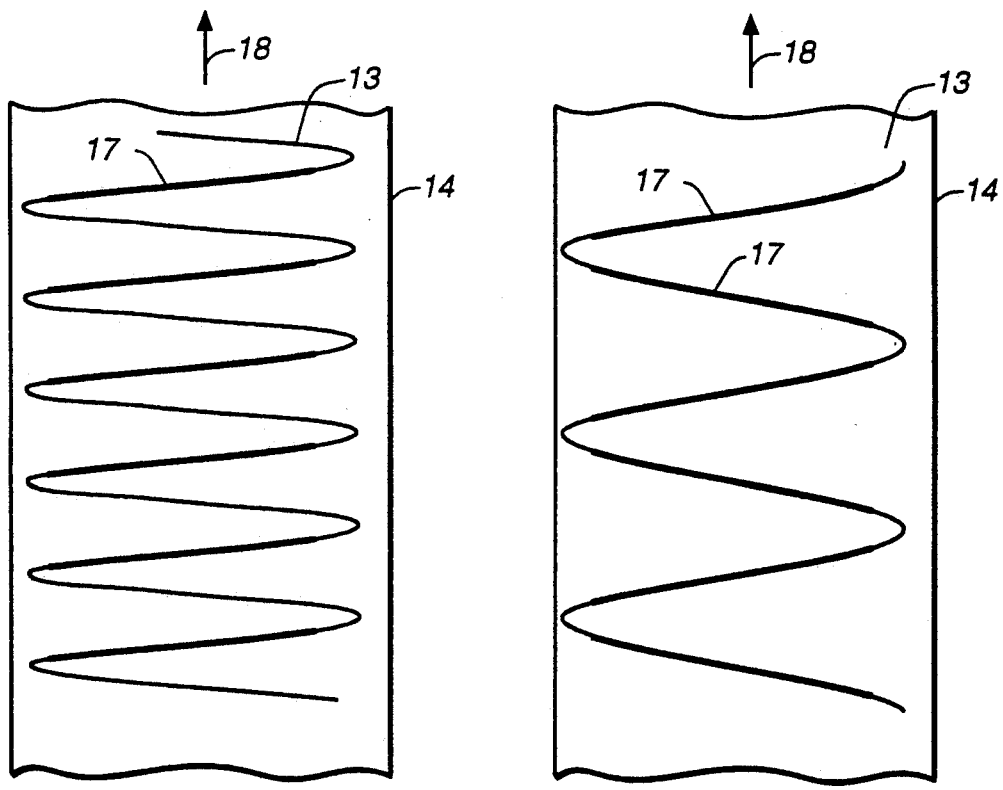
FIG._2A    FIG._2B

FIG._3A
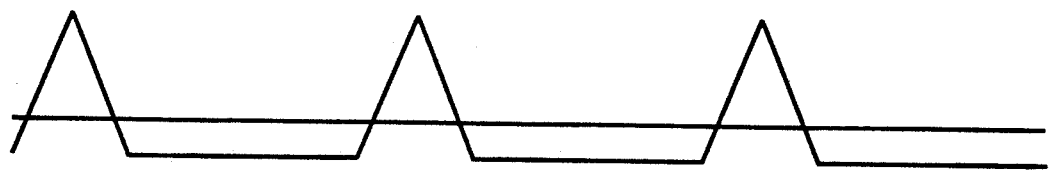
FIG._3B
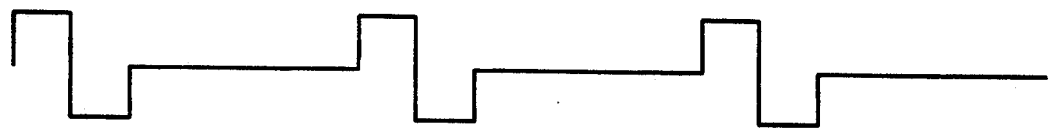
FIG._3C
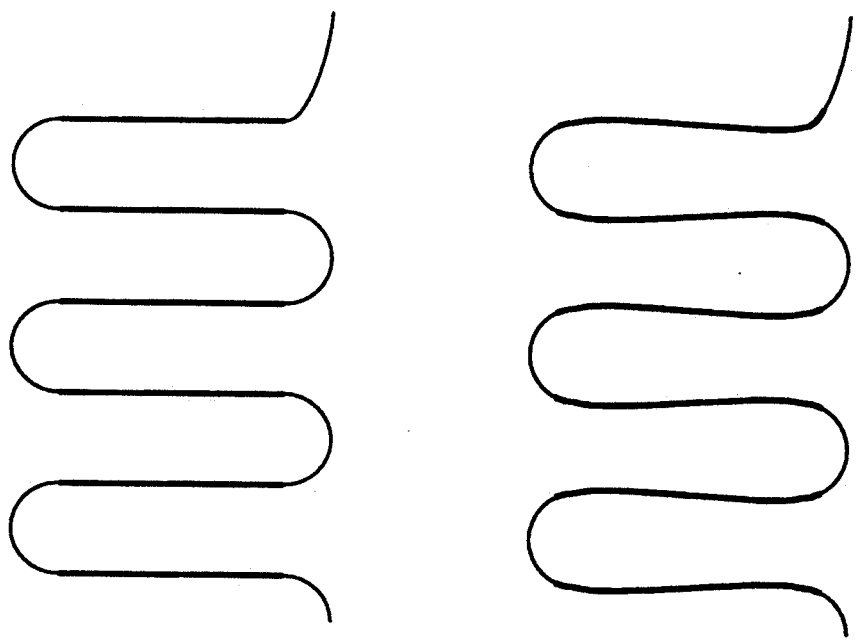
FIG._4        FIG._5

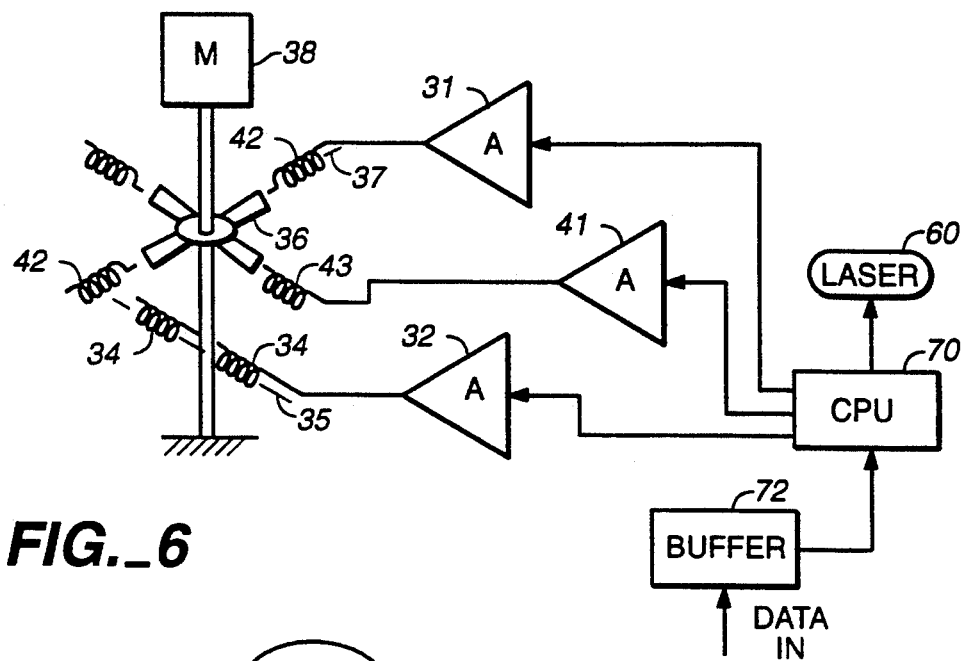
FIG._6
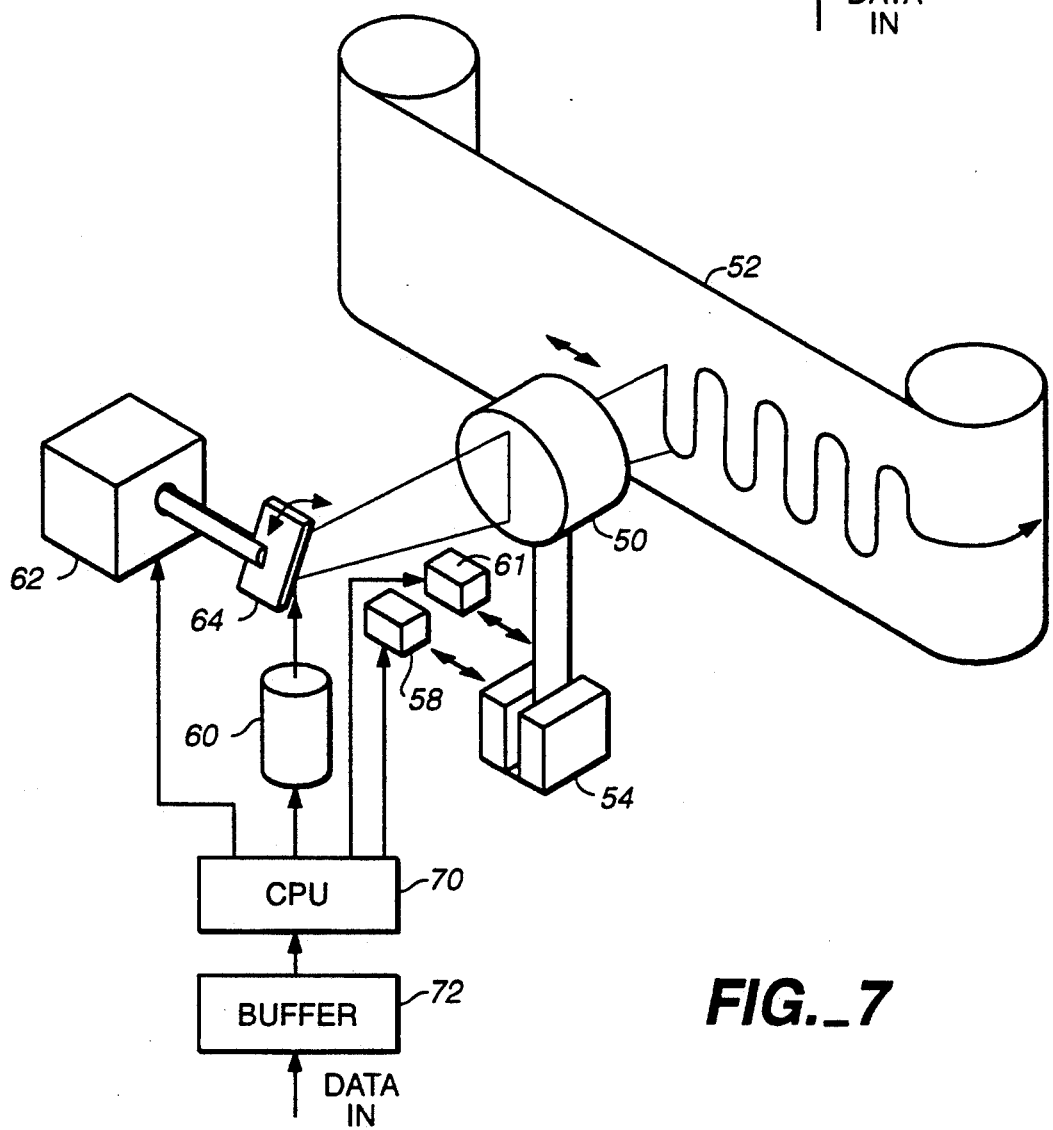
FIG._7

BIDIRECTIONAL SINUSOIDAL SCANNING SYSTEM

BACKGROUND OF THE INVENTION

1. Field of the Invention

The present invention relates generally to video recording and playback. More particularly, the invention relates to sinusoidal scanning systems and methods for optical writing and reading of data with respect to a storage medium such as a flexible optical tape.

2. State of the Art

Presently, flexible tape for optical storage of data is known, as described in U.S. Pat. Nos. 4,719,615 and 4,912,696, both identified on their faces as being assigned to Optical Data, Inc. To optically record data on a medium such as a flexible optical tape, a beam of laser light is directed onto the tape. The laser beam melts the tape or burns holes in the tape to produce data spots representing bits of data. The data spots have a reflectivity, transmissivity or other optical characteristic which can be distinguished from the background of the optical tape. Presently, optically sensitive tape has not been effectively used to record high frequency signals such as television video signals.

Generally speaking, television pictures are comprised of snapshot-like "frames" that contain video signal information in horizontal scan lines organized by synchronizing signals. For example, according to the standards of the National Television Systems Committee (NTSC), each frame of video information comprises 525 horizontal scan lines. Further according to NTSC standards, the frame repetition rate is thirty frames per second, or 15,750 horizontal scan lines per second.

In practice, all of the video information in a complete television frame is not reproduced at a receiver simultaneously; instead, a technique known as interlaced scanning is used to reduce flicker. In interlaced scanning, each frame of video information is divided into two interlaced fields, each comprising a raster array of odd numbered or even numbered horizontal scan lines. Thus, if the horizontal scan lines of a 525-line NTSC frame were numbered sequentially from the top of a raster array, an odd-line field would comprise numbered horizontal scan lines 1, 3, 5, and so forth through frame line 525. Similarly, an even-line field would include numbered lines 2, 4, and so forth through line 524. According to the NTSC format, the field repetition rate is sixty fields per second.

In video recording systems that employ magnetic videotape as the recording medium, it is conventional to record each television field by using only a single track on the recording medium. This single track is traced by a recording head which helically scans the recording medium. (Helical recording heads are widely used because they provide high head-to-tape speed, usually exceeding one meter per second, with relatively slow moving tape). FIG. 1 shows an example of four fields of video information recorded in parallel tracks 2, 4, 6 and 8, respectively, which extend at a small angle (e.g., 5 to 15 degrees) relative to the longitudinal edge of a magnetic videotape 10.

However, optical recording and playback of data poses significant problems which do not arise in traditional magnetic recording playback systems. For example, in establishing relative movement between a laser and a flexible tape, there is a limit to how rapidly the optical characteristics of a spot on the tape can be altered to form a data spot. Such a limit can be significant when the information being recorded includes high frequency video information. Further, such a limitation can be significant when attempting to optimize space efficiency in recording information on the optical tape.

Accordingly, it would be desirable to provide a system and method for efficiently writing and reading information to and from an optical recording medium such as a flexible optical tape. The system should be cost-effective in efficiently writing and reading information such as analog and/or digital data, including audio-video signals.

SUMMARY OF THE INVENTION

The present invention therefore relates to video recording and playback techniques and devices which control relative movement between a laser and an optical medium such as a flexible optical tape to record and play back data. In a preferred embodiment, information such as television signals is recorded on a flexible optical tape in a manner which optimizes recording speed and efficient tape utilization.

In a preferred embodiment, the invention relates to a method for scanning an optical recording medium comprising the steps of moving said optical recording medium in a first direction, sinusoidally scanning a beam of light over said moving optical recording medium in a second direction substantially perpendicular to said first direction to establish a scan path over said optical recording medium, and periodically deflecting said sinusoidal scanning beam in said first direction. By linearizing at least a portion of the scan path, two traces can be made per cycle of a primary sinusoidal deflection, thereby doubling scanning efficiency.

BRIEF DESCRIPTION OF THE DRAWINGS

Other aspects of the present invention will become more apparent from the following detailed description of the preferred embodiments as described in conjunction with the accompanying drawings, in which:

FIG. 1 shows, as discussed above, scan traces of a playback head in a conventional video recording system;

FIGS. 2a and 2b show sinusoidal traces for recording and reading video information in accordance with the present invention;

FIGS. 3a to 3c show waveforms used to control scanning of an optical beam for recording and reading in accordance with the present invention;

FIGS. 4 and 5 show scan path traces linearized in accordance with the present invention; and FIGS. 6 and 7 show exemplary embodiments of systems for writing and reading data using a galvanometer scanning system controlled in accordance with the present invention.

DETAILED DESCRIPTION OF THE PREFERRED EMBODIMENTS

FIG. 2 shows an example of a generally sinusoidal trace 13 formed by a laser beam which is directed by a torsional, resonant-mirror galvanometer to travel across an optical recording tape 14 which moves slowly in the direction of arrow 18. It should be noted that video signal information can be recorded in both directions across the tape. In other words, recording can be done from left to right, and then from right to left across the tape as shown in FIG. 2b. To preserve a video signal on a storage medium (e.g., flexible optical tape) such that it can be replayed at a later time, all video signal information including the traditional horizontal scan lines must be recorded.

Preferably, a modified frequency modulation (MFM) technique is used to write data spots on the optical type. Where MFM is used, a set of data spots ranging in size from 1 to 2 microns is used to represent video information on the tape. Data spots are preferably separated by no more than two microns to permit their easy reading once recorded on the tape.

With regard to FIGS. 2a and 2b, it should be understood that the torsional galvanometer preferably provides non-continuous video recording. That is, video recording takes place when the laser beam traces over "active" portions 17 of the recording medium, but does not occur during periods at the end of each trace when the scanning motion of the laser beam is stopped and then reversed in direction.

"Active" portions 17 of sinusoidal trace 13 are defined as those portions of the trace during which the tracing velocity is more than one-half of its value at the center of the trace. During remaining portions of the trace, the scanning velocity slows to reverse scanning direction.

In practice, the active portion of each trace occupies about 87 percent of the peak-to-peak amplitude of the trace and represents a duty cycle of approximately 67 percent. Television video information, encoded in digital or analog form, can be recorded in the active portions 17. The remaining portions of the traces are recorded at speeds which are too low for recording high frequency video signals. Accordingly, these remaining portions of the traces can be used for recording lower frequency (i.e., low bandwidth) information as described in commonly assigned, co-pending application Ser. No. 07/944,977 filed Sep. 15, 1992 entitled "Data Formats on Optical Video Tape", the disclosure of which is hereby incorporated by reference in its entirety.

Still further with regard to FIGS. 2a and 2b, it should be noted that the active portions 17 are nearly perpendicular to the longitudinal edges of tape 14. This orientation of recorded video information can be contrasted to the recorded tracks in FIG. 1 which are substantially non-perpendicular to the longitudinal edges of the tape. As the orientation of the traces becomes more perpendicular, improved implementation of special effects such as still, slow scan and fast scan of recorded video information can be realized, as described in commonly assigned, co-pending U.S. application Ser. No. 07/817,622, filed Jan. 7, 1992, entitled "Video Tape Format Having Special Effects Capabilities", the disclosure of which is hereby incorporated by reference in its entirety.

In accordance with the present invention, an optical deflection mechanism such as the resonant-mirror galvanometer described above is used to record video information in the centrally located active portions 17 of the traces. In an exemplary embodiment, the video information recorded on each active portion 17 comprises an integral number of the horizontal scan lines of a television field. For example, the first horizontal active portion 17 includes four horizontal scan lines from an even field of a television video frame; the second horizontal active portion includes the four subsequent horizontal scan lines from the same field, and so on.

As mentioned above, the left and right ends of each active scan portion can be used for recording lower frequency audio and control data, respectively. The low frequency control data can include, for example, control information that identifies the line number of the first horizontal scan line stored in the active scan portion following the data. Further, the control information can be scene information for enabling a particular portion of the recorded information to be quickly identified during playback.

Continuous input video signals represented by, for example, values of luminance (Y) and chrominance (C), as well as continuous audio signals can be converted into time-compressed bursts for writing on the optical tape. These bursts are timed to occur when the galvanometer is scanning the appropriate portions of the tape as defined by the aforementioned tape data format. The conversion from continuous to intermittent representations of the information is accomplished using an electronic buffer capable of holding information during the time which corresponds to at least two galvanometer cycles. A technique for accomplishing this buffering is described in greater detail in commonly assigned, co-pending application Ser. No. 07/944,951 filed Sep. 15, 1992, entitled "Buffering Method and System for Resonant Scanner", the disclosure of which is hereby incorporated by reference in its entirety.

The use of a self-resonant galvanometer as the primary deflector provides significant advantages. For example, because this device is relatively simple in design (i.e., it does not require bearings or sliding parts), it possesses an almost infinite life. However, because it is self-resonant, its frequency is not easily synchronized with periodic blocks of incoming data such as the horizontal scan lines of a television picture signal. It is for this reason that data associated with the horizontal scan lines is buffered in memory and supplied to the galvanometer on demand.

A galvanometer is selected which has a resonant period slightly shorter than that of the input data block period. Hence the galvanometer can record the information without data loss since it can empty the memory buffer faster than the buffer is filled by incoming data. Because the buffer can be emptied faster than it can be filled, there are cyclic pauses during which the scanning device is ready for additional information but the buffer has not yet been filled. In these instances, the recording process is periodically halted for a complete galvanometer cycle while the input buffer is filled. This pause is referred to herein as "cycle-skip".

Operation of a scanning device in accordance with an exemplary embodiment will now be described. A sinusoidal scanner can be controlled with an appropriate motion along the direction of optical tape movement such that uniformly spaced loci can be obtained. Even a simple second-harmonic sinusoidal addition is satisfactory for many applications and makes bi-directional scanning practical.

For this purpose, a time-varying component is added to the signal used to control deflection of the resonant galvanometer in the direction of tape movement to compensate for movement of the medium during the sinusoidal active line. The wave shape of this added component ideally includes a linear regressive portion during each active line time which exactly compensates for the forward motion of the medium. A suitable correction waveform, referred to herein as a fast period component, is shown in FIG. 3a. FIGS. 3b and 3c show velocity and acceleration profiles which correspond to the FIG. 3a waveform.

By applying the fast period component shown in FIG. 3a, the sinusoidal traces of the optically scanned beam can be compensated to provide nearly linear traces which are arranged nearly perpendicular to the direction of tape movement, as shown in FIG. 4. However, it will be appreciated that nearly perfect correction may not always be required. For example, acceptable results may be obtained with a simple sinusoidal harmonic motion of twice the frequency of the primary scanning sinusoid applied in a direction perpendicular to tape movement, yet applied in the direction of tape movement to produce a scan path as shown in FIG. 5.

Those skilled in the art will appreciate that it is often easier to make sinusoidal movement rather than sawtooth movement because structures may be designed to resonant near the required frequency. A twice-frequency sinusoid can simply be added to the linear tape movement direction deflection motion of the galvanometer. For this case, the peak amplitude of the added compensation is 12% of the total distance traversed in the direction of tape movement in one cycle of the primary sinusoid.

To introduce the fast period component of a correction signal for controlling the resonant galvanometer, different techniques can be used. For example, the correction may be introduced at the scanning device as a small deflection perpendicular to its primary sinusoidal motion. Alternately, the corrections can be introduced in the optical path between the scanning device and the medium using, for example, a small deflecting mirror or a small translation of a lens. Further, the correction may be introduced at the medium itself by stepping it in synchronism with the scanner so that it is moved only between active line intervals.

Introduction of a correction at the scanning device via a small deflection perpendicular to the primary sinusoidal motion of a resonant galvanometer is shown in FIG. 6. More particularly, a small correction motion perpendicular to the primary oscillatory sinusoidal deflection of the self-resonant torsional rod 30 is induced magnetically by applying a waveform corresponding to the FIG. 3c acceleration profile.

Generally speaking, data can be written to or read from optical tape using a system which includes a means for illuminating an optical tape, such as a solid state semiconductor laser. Means for transmitting light from the laser to the optical tape can include a collimating lens, a light expanding means, a polarizing beam splitter, a quarter wave plate, a scanning galvanometer mirror (and scanning mirror drive) and a focusing lens. One skilled in the art will appreciate that the deflection compensation described in accordance with the present invention can be introduced into the optical path by moving any of these optical elements or any combination of them. Thus, a nearly linear trace can be maintained despite the fact that the galvanometer has been deflected in the direction of tape movement.

As shown in FIG. 6, a primary oscillatory sinusoidal deflection is input via a torsional drive amplifier 32 and coil 34 for interaction with a magnetically permeable ring 36 attached to the torsional rod 30. A sinusoidal waveform input via the coil 34 causes the torsional rod 30 and a mirror 38 attached to the rod to deflect back and forth along an axis 35. This motion, coupled with the tape movement, produces a sinusoidal scan path which traces back and forth across the moving tape.

The fast period correction signal is introduced via a second drive amplifier 40 and coil 42. The waveform input to this amplifier corresponds to the aforementioned FIG. 3c acceleration profile. The coil 42 is oriented so that a nodding motion of the mirror 38 will cause a laser beam deflected off the mirror to track the motion of the moving medium during active scan time.

FIG. 7 shows an alternate configuration for implementing correction of the sinusoidal trace to create nearly linear, parallel traces perpendicular to the direction of tape movement. In FIG. 7, a final focusing lens 50 of a scanner is physically translated periodically in a direction parallel to the motion of the medium 52. The lens is attached to a flexible support 54 which is oscillated at a resonant frequency by a piezoelectric actuator 58. It will be appreciated by those skilled in the art that the piezoelectric actuator can be replaced by any suitable actuator including a drive solenoid or any other device capable of moving the lens through the desired profile.

The oscillating lens 50 causes the laser beam from a laser 60 to be reflected off a primary sinusoidal scanner 62 which includes a mirror 64. The peak motion required is relatively small, with the peak excursion needed being about ¼ of the distance between adjacent scan lines on the optical recording medium.

The fast period component deflection waveform is relatively small, and does not exceed the spatial galvanometer period (peak-to-peak). For example, a typical optical tape recording system would, for example, include a bi-directional galvanometer with a spatial period of 3.2 micrometers on the tape. Hence a deflection actuator capable of providing, for example, plus or minus 2 micrometers of spot movement along the velocity direction of the tape would be adequate. Such movement is well within the range of known piezoelectric actuators.

The scanning galvanometer mirror is oscillated at a predetermined frequency in a direction transverse relative to tape movement. Light directed toward the flexible tape is thereby scanned back and forth across the tape. Similarly, light reflected by data spots stored across the tape (i.e., in tracks perpendicular relative to tape movement) is directed to the stationary detector via the scanning galvanometer mirror. The predetermined frequency at which the galvanometer oscillates is selected on the basis of tape speed movement.

Although the exemplary embodiment described above has been discussed in the context of an optical system which uses flexible optical tape, it will be appreciated that the invention can be applied to any scanning system which optically records or reads data. Further, although an exemplary embodiment has been described in the context of a television video signal, it will be appreciated that any signals can be recorded using the above-identified technique.

Further, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for scanning an optical recording medium comprising the steps of:
   moving said optical recording medium in a first direction;
   sinusoidally scanning a beam of light over said moving optical recording medium in a second direction substantially perpendicular to said first direction to establish a scan path over said optical recording medium;
   periodically deflecting said sinusoidal scanning beam in said first direction in a manner that linearizes at least a portion of said scan path relative to said optical recording medium; and
   recording information on said optical recording medium during bidirectional traces of said scan path.

2. A method for scanning an optical recording medium comprising the steps of:
   moving the optical recording medium in a first direction;
   sinusoidally scanning a beam of light over said moving optical recording medium in a second direction substantially perpendicular to said first direction to establish a scan path over said optical recording medium, with the scanning being accomplished at a speed relative to the recording medium speed that permits video signal information associated with video signal fields to be stored during consecutive scan cycles; and,
   periodically deflecting said sinusoidal scanning beam in said first direction.

3. Method according to claim 2 wherein said optical recording medium is a flexible optical tape.

4. Method according to claim 3 wherein said step of periodically deflecting further includes a step of:
   providing a time-varying component having a linear regressive portion to control deflection of a resonant galvanometer in said first direction.

5. Method according to claim 3 wherein said step of periodically deflecting further includes a step of:
   providing a harmonic signal with twice a frequency of said sinusoidal scanning to control deflection of a resonant galvanometer in said first direction.

6. Method according to claim 3 wherein said step of periodically deflecting further includes a step of:
   providing a compensation signal with a peak amplitude which is approximately 12% of a distance traversed in said first direction during one cycle of said sinusoidal scanning.

7. Apparatus for scanning a flexible optical tape recording medium comprising:
   means for moving the flexible optical tape recording medium in a first direction;
   means for sinusoidally scanning a beam of light over said moving optical recording medium in a second direction substantially perpendicular to said first direction to establish a scan path over said optical recording medium; and
   means for periodically deflecting said sinusoidal scanning beam in said first direction.

8. Apparatus according to claim 7 wherein means for scanning further includes:
   means for illuminating the optical recording medium;
   means for transmitting light from the illuminating means to the optical recording medium, said transmitting means further including a torsional resonant galvanometer.

9. Apparatus for scanning an optical recording medium comprising:
   means for moving the optical recording medium in a first direction;
   means for sinusoidally scanning a beam of light over said moving optical recording medium in a second direction substantially perpendicular to said first direction to establish a scan path over said optical recording medium;
   means for illuminating the optical recording medium;
   means for transmitting light from the illuminating means to the optical recording medium, said transmitting means further including a torsional resonant galvanometer; and
   means for periodically deflecting said sinusoidal scanning beam in said first direction.

10. Apparatus according to claim 9 wherein said means for scanning further includes:
    a first amplifier for introducing a primary sinusoidal deflection of said torsional resonant galvanometer.

11. Apparatus according to claim 10 wherein said periodic deflecting means further includes:
    a second amplifier for introducing a correction motion perpendicular to said primary sinusoidal deflection.

12. Apparatus according to claim 11 wherein said scanning means further includes:
    a mirror connected with said torsional resonant galvanometer for deflecting said light beam in said first and second directions.

13. Apparatus according to claim 11 wherein said periodic deflecting means further includes:
    an movable lens for deflecting said light beam in said first direction in response to an output from said second amplifier.

* * * * *